June 21, 1955  P. AUDEMAR  2,711,332
FLUID SEAL
Filed March 24, 1954
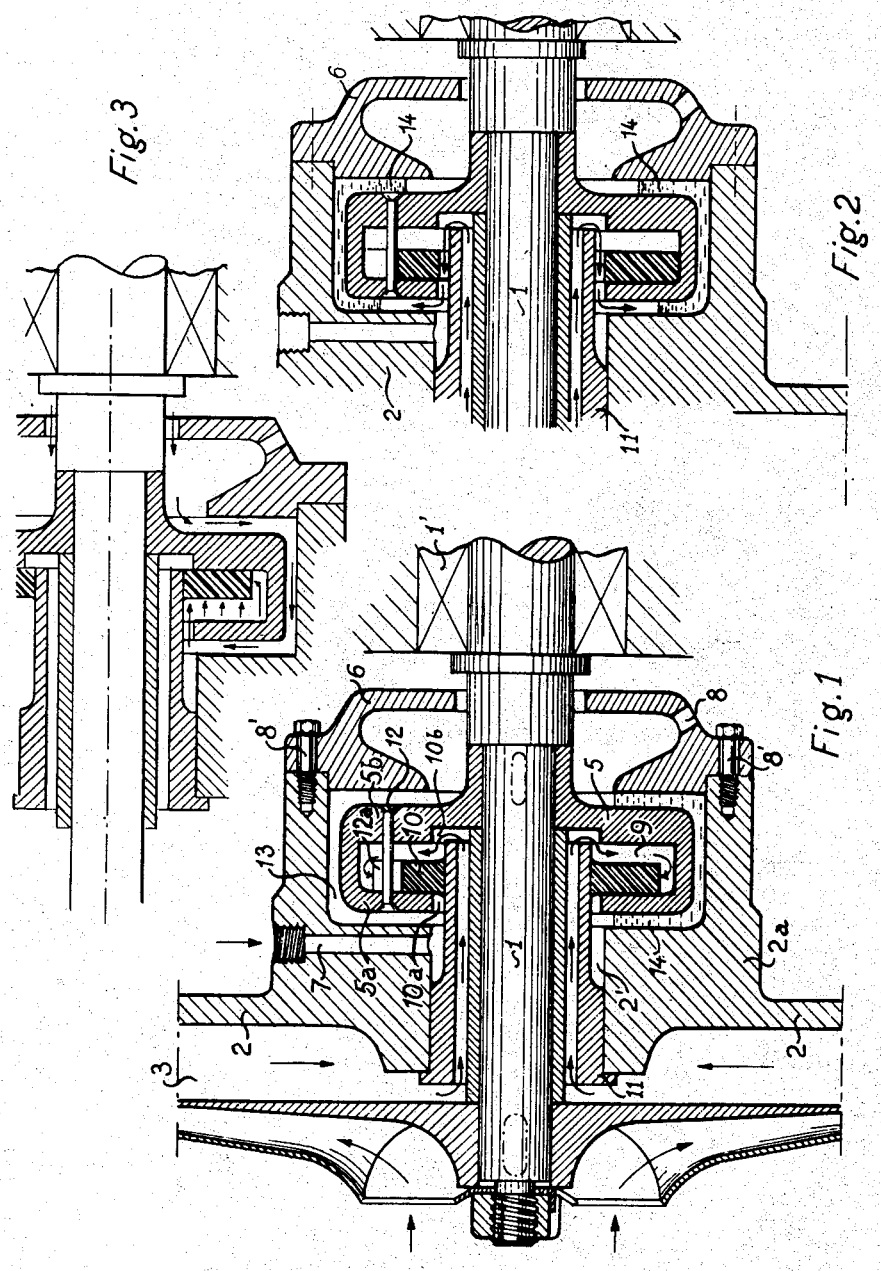
Inventor
P. Audemar

United States Patent Office 2,711,332
Patented June 21, 1955

2,711,332

FLUID SEAL

Pierre Audemar, Mulhouse, France, assignor to Societe Alsacienne de Constructions Mecaniques, Mulhouse, Haut-Rhin, France, a French company Application March 24, 1954, Serial No. 418,452

Claims priority, application France September 15, 1953

1 Claim. (Cl. 286—9)

This invention relates to seals for preventing leakage of fluid between a wall of the casing of a machine such as a pump, a turbine etc. and a rotating shaft accommodated through an opening in said wall.

Seals (hereinafter called "liquid seals") are known in which a liquid is rotated in an annular retaining channel provided in said casing and communicating with said opening so that a pressure is centrifugally generated in the liquid sufficient to prevent leakage of fluid through the said retaining channel.

The rotation of the liquid in the annular reetaining channel may be caused by an impeller rotated therein. Liquid seals of this kind are usefully employed for sealing purposes where friction losses must be reduced to a minimum, but hitherto they have suffered from the disadvantage that leakage occurs when the centrifugally generated pressure falls below the leakage pressure, as, for example, when the speed of rotation is reduced or falls to zero.

Seals formed by cooperating members situated on respective relatively rotatable parts of machines and pressed into contact with each other (hereinafter called "contact seals") are likewise known and do not suffer from the disadvantage mentioned in connection with liquid seals but they are a source of considerable wear and friction losses and these losses may become objectionable or even prohibitive in contact seals subject to high leakage pressures or high relative speeds of rotation or a combination of both conditions.

An object of the persent invention is to provide between an opening in a casing wall and a rotating shaft accommodated therethrough an improved seal which shall comprise, in combination, a liquid seal operative above a certain speed of the shaft and a contact seal operative exclusively under a speed at least equal to the first mentioned one, so that tightness is ensured at any time, without objectionable frictions.

Another object of the invention is to provide a sealing device of the type described, in which the suppression of the friction of the contact seal is caused directly by the centrifugal force due to the rotation of the shaft, once said centrifugal force has reached a sufficient value to create the annular liquid seal.

Another object of the invention is to provide, in a combined sealing device of the type described, a contact seal constituted by a ring applied at rest on a stationary sleeve surrounding the shaft by its inner cylindrical surface, i. e. on an area which is very reduced with respect to the annular area of contact of the above-described known frusto-conical sealing washer, said inner surface of the ring sealing member according to the invention being taken off said sleeve under the action of centrifugal force by a radial deformation, i. e. in the very direction of said centrifugal force.

Still another object of the invention is to provide a combined seal of the type described in which the impeller generating the liquid seal is formed with an inner chamber in which the ring seal is so mounted as to be freely deformable while being rotatable with said impeller around a fixed cylindrical sleeve coaxial with the shaft, said chamber having diametral walls which constitute axial abutments for said ring extending inwardly up to a short distance of said sleeve.

A further object of the invention is to use the inner space of the impeller in which the sealing ring is thus housed as a pressure chamber fed either with fluid from the casing or with air from outside for tightly applying said ring against one or the other of said axial abutments and to cooperate with the elasticity of said ring to tightly clamp the same around said sleeve at rest.

Other objects and advantages of the invention will be apparent from the following detailed description, together with the accompanying drawings, submitted for purposes of illustration only and not intended to define the scope of the invention, reference being had for that purpose to the subjoined claims.

In these drawings:

Fig. 1 is an axial view of a combined liquid and contact seal according to the invention showing the contact seal in its operative position (the liquid seal being not formed), in the case when the inside pressure is higher than the external one.

Fig. 2 is an axial view of the sealing device of Fig. 1 showing the contact seal out of duty with the liquid seal in operative condition, and Fig. 3 is an axial view showing the seal according to the invention in the same conditions as in Fig. 1, but when the external pressure is higher than the inside one.

The combined sealing device according to the invention has for its purpose to prevent leakage of fluid along a shaft 1 journalled in a bearing 1' and accommodated through an opening 2' in a wall 2 of a casing 3, either from inside said casing in the case shown in Fig. 1, or from outside towards said casing, in the case shown in Fig. 3, and this as well at rest as at any speed of rotation of shaft 1.

In order to create a liquid seal capable of opposing said leakage when shaft 1 rotates, there is provided in a boss 2a of wall 2 around shaft 1 a liquid retaining cylindrical chamber 13 coaxial with said shaft in which a proper liquid may be introduced through an inlet 7 and from which the excess of said liquid can be evacuated through an outlet 8. This liquid is so chosen as to have a density higher than that of the fluid of which the pressure is to be sealed. An impelling member 5 is keyed on shaft 1 to rotate inside chamber 13. The only possible leakage path passes, through the annular clearance between shaft 1 and the wall of opening 2' through chamber 13 and between shaft 1 and a cap 6 secured on boss 2a while, in said chamber 13 proper, said path surrounds the impelling member 5.

When the impelling member 5 is imparted with a sufficient speed of rotation, the liquid in chamber 13 is projected towards the periphery of said chamber under the action of centrifugal force and forms an uninterrupted annular liquid seal between the periphery of the impelling member 5 and that of chamber 13, as shown at 14. The pressure in liquid seal 14 is a function of the rotation speed of shaft 1.

According to the invention, in order to prevent leakages at rest (or more generally under a given rotational speed of shaft 1), the above-described liquid seal is combined with a contact seal adapted to ensure tightness between shaft 1 and wall 2 in either possible direction of said leakages under said rotational speed, while the friction of said seal is automatically suppressed when shaft 1 reaches said speed.

For this purpose, an axial sleeve 11 forcedly fitted in opening 2' projects in chamber 13. Around said sleeve 11 is tightly fitted at rest an elastic ring member 10 rotatively fast with the impelling member 5 and tightly obturating (also at rest) the above-mentioned only possible path of leakage around the impelling member 5. Upon rotation of shaft 1, the elastic ring member 10 is deformed under the action of the centrifugal force generated by said rotation and, in particular, its inner diameter increases, which suppresses contact between said ring and sleeve 11. Now, while being fast in rotation with the impelling member 5, the elastic ring 10 must remain free to be deformed under said centrifugal action. For this purpose, ring 10 is mounted freely in an inner chamber 9 formed in the impelling member 5 and it is made rotatively fast with the latter by means of pins 12 freely engaged in notches 12a provided for this purpose in the periphery of said ring.

Furthermore, according to the invention, the presence of said inner chamber 9 in the impelling member 5 is taken advantage of to use the fluid pressure to be sealed in such a manner as to increase the pressure with which said ring is applied around the sleeve 11, as well as to apply said ring tightly against the impelling member 5, these two conditions preventing fluid from leaking between said impelling member and said sleeve. For this purpose, said chamber 9 communicates, on the one hand, with the annular clearance between shaft 1 and sleeve 11 through an annular passage 10b and, on the other hand, with outside through an annular passage 10a. Furthermore, the two opposed annular walls 5a—5b of the inner chamber 9 each act as an axial abutment surface for the ring member 10, said surfaces extending inwardly up to the near vicinity of sleeve 11, thus preventing ring 10 to escape axially through passages 10a or 10b under the action of the pressure in chamber 9. Furthermore, when tightly applied on surface 5a, the ring member 10 interrupts the communication between chamber 9 and outside by obturating the annular passage 10a (position shown in Fig. 1), while when applied on member 5b (position shown in Fig. 3), said ring member 10 obturates passage 10b and thus interrupts communication between chamber 9 and the inside of casing 3.

It will be easily understood that the whole assembly is so designed as to ensure tightness at any speed of rotation of shaft 1 including at rest, either under the action of the contact seal constituted by the ring member 10, or by means of the liquid seal formed from a given speed of rotation of shaft 1. In other words, the sealing contact between ring 10 and the axial sleeve 11 must be suppressed under the action of centrifugal force only when the latter has become sufficiently important to form the liquid seal.

While the invention has been described with particular reference to a preferred embodiment, it is not intended to limit the scope of the invention to the embodiment illustrated, nor otherwise than by the terms of the subjoined claim.

What is claimed is:

A combined liquid and contact seal between a rotating shaft and a casing wall through which said shaft is accommodated comprising, in combination, an annular space in said wall coaxial with said shaft, a stationary sleeve tightly fitted in said wall, freely surrounding said shaft with an annular clearance and protruding in said space, an annular impelling member tightly keyed on said shaft and freely housed in said space to form with the wall of the same an annular passage of generally U-shaped cross-section, said impelling member being secured to said shaft beyond and spaced from the end of said stationary sleeve forming a clearance therebetween, means to fill said space with liquid to a level partly submerging said impelling member, an inner chamber in said impelling member having two opposed annular faces substantially right-angled with its axis, an elastic ring housed in said chamber with a substantial axial clearance from one annular face and with a radial clearance from the inner annular wall of said chamber and surrounding said sleeve, and means to make said ring rotatively fast with said impelling member without imparting radial expansion thereof, said ring tightly fitting the sleeve while the shaft is at rest, and being radially expanded away from the sleeve when the shaft reaches a given speed of rotation, rotation of the shaft at said given speed centrifugally disposing the fluid is sealing relation between said impeller member and the U-shaped passage.

References Cited in the file of this patent

UNITED STATES PATENTS 2,258,527    Warman ------------------ Oct. 7, 1941
2,665,929    Sawyer ------------------ Jan. 12, 1954